US007589736B1

(12) United States Patent
West

(10) Patent No.: US 7,589,736 B1
(45) Date of Patent: Sep. 15, 2009

(54) SYSTEM AND METHOD FOR CONVERTING A PIXEL RATE OF AN INCOMING DIGITAL IMAGE FRAME

(75) Inventor: Michael G. West, Portland, OR (US)

(73) Assignee: Pixelworks, Inc., Tualatin, OR (US)

( * ) Notice: Subject to any disclaimer, the term of this patent is extended or adjusted under 35 U.S.C. 154(b) by 0 days.

(21) Appl. No.: 10/150,557

(22) Filed: May 17, 2002

Related U.S. Application Data

(60) Provisional application No. 60/292,183, filed on May 18, 2001.

(51) Int. Cl.
*G06F 12/02* (2006.01)
*G09G 5/36* (2006.01)
*G09G 5/00* (2006.01)

(52) U.S. Cl. ........................ 345/543; 345/547; 345/3.2; 345/560

(58) Field of Classification Search ................. 345/534, 345/531, 660, 698, 699, 558, 519, 564, 560, 345/530, 545, 213, 543; 710/52, 53, 56, 710/57; 348/441, 443, 445, 458, 459, 449
See application file for complete search history.

(56) References Cited

U.S. PATENT DOCUMENTS 4,858,107 A 8/1989 Fedele
4,862,269 A 8/1989 Sonoda et al.
4,907,086 A 3/1990 Truong
5,410,357 A * 4/1995 Rieger et al. ................ 348/458
5,442,390 A * 8/1995 Hooper et al. ................ 725/90
5,453,792 A * 9/1995 Gifford et al. ............... 348/441
5,512,921 A * 4/1996 Mital et al. ................. 345/555
5,592,194 A 1/1997 Nishikawa
5,606,348 A * 2/1997 Chiu .......................... 345/213
5,680,178 A 10/1997 Takeuchi
5,739,867 A 4/1998 Eglit
5,874,937 A 2/1999 Kesatoshi
5,914,753 A * 6/1999 Donovan .................... 348/441
5,919,265 A * 7/1999 Nishtala et al. ............. 713/400
5,978,868 A * 11/1999 Maas .......................... 710/52
6,040,917 A * 3/2000 Campbell et al. .......... 358/1.17
6,046,738 A 4/2000 Eglit et al.
6,072,548 A * 6/2000 Schoner et al. ............. 345/520
6,177,922 B1 * 1/2001 Schiefer et al. ............. 345/698
6,208,354 B1 * 3/2001 Porter ........................ 345/634
6,313,822 B1 * 11/2001 McKay et al. .............. 345/698
6,316,974 B1 * 11/2001 Taraci et al. ................ 327/147
6,498,536 B1 * 12/2002 Mori ........................... 331/11
6,567,099 B1 * 5/2003 Dawson ...................... 345/611
6,694,388 B1 * 2/2004 Schzukin et al. .............. 710/52
6,724,334 B2 * 4/2004 Tzelnick ..................... 341/144

* cited by examiner

*Primary Examiner*—Hau H Nguyen
(74) *Attorney, Agent, or Firm*—Marger Johnson & McCollom, P.C.

(57) ABSTRACT

A system and method for converting a pixel rate of a digital image frame is provided. The system includes a display controller with an embedded buffer and programmable input and output buffers. The input buffer writes lines of the frame at a source pixel rate while the output pointer reads out lines of the frame at a display pixel rate thereby allowing display of an image having a source pixel rate that is different, e.g., higher, than a display pixel rate.

27 Claims, 5 Drawing Sheets

SYSTEM AND METHOD FOR CONVERTING A PIXEL RATE OF AN INCOMING DIGITAL IMAGE FRAME

This application claims priority from U.S. provisional patent application Ser. No. 60/292,183 filed May 18, 2001, incorporated herein by reference.

BACKGROUND OF THE INVENTION

1. Field of the Invention

This invention relates to a system and method for manipulating digital image data capable of being displayed on a variety of digital display devices including flat panel displays. More particularly, this invention relates to a system and method for converting a pixel rate of an incoming digital image frame.

2. Background of the Invention

Digital image data is input to a system adapted to visually display digital image data on a display device. Digital image data is input to a frame locked system one frame at a time at an input frame or vertical refresh rate. A frame is an image displayed for viewing on a display device or panel at one time, i.e., one frame of data fits on the display device screen or panel. Each frame includes a rectangular array of pixels. Each pixel has one or more values, for example, a gray scale luminance value for a monochrome display or red, green, and blue (RGB) luminance values for a color display. The resolution of the array, i.e., the number of horizontal and vertical pixels, is often referred to as an image frame resolution. Common display frame resolutions include that shown in Table 1 indicating, in the second and third columns, the number of pixels in the vertical and horizontal dimensions, respectively:

TABLE 1

| | | |
|---|---|---|
| VGA | 640 | 480 |
| SVGA | 800 | 600 |
| XGA | 1024 | 768 |
| SXGA | 1280 | 1024 |
| UXGA | 1600 | 1200 |
| HDTV | 1280 | 720 |

Display devices must be refreshed many times per second. The frame rate for a display device is measured in hertz (Hz). Digital image data is input at an input frame rate. An input frame rate is the rate at which a frame of data is received by the system. An output frame rate is the rate at which digital image data is provided to a display device for visually displaying the input image data. Common input and output frame rates include 60, 75, and 85 Hz and the like.

Where the input frame rate and/or resolution match the output frame rate and/or resolution, the frame of image data is displayed directly without issue. If, however, the input and output frame rates and/or the resolutions differ substantially, the image data might not be properly displayed on the display device. This is particularly true in frame locked systems where small line memories are commonplace since these line memories do not allow for full conversion of the input frame rate to an output frame rate that matches the display frame rate.

The system displays an image by enabling or activating discrete picture elements (pixels) contained within the display device. The system enables each pixel by successively scanning horizontal lines of the pixel array responsive to the digital image data. That is, the system scans a line of the pixel array, retraces, scans a next line of the pixel array, and so on, activating individual pixels during each scan. The rate at which the system scans each line horizontally is termed the horizontal display frequency or pixel rate.

A source typically encodes incoming source digital image data at a source pixel rate. A display, in turn, operates at a display pixel rate. In general, it is desirable for the source pixel rate to equal the display pixel rate for a proper reproduction of the image. The industry trend is to provide digital image data to displays at higher and higher source pixel rates because they enable higher frame rates and/or resolutions that, in turn, lead to higher quality images. The display pixel rates, unfortunately, have not kept up with the increase in source pixel rates. Oftentimes it is desirable to display an image having a source pixel rate that is different, e.g., higher, than a display pixel rate.

Accordingly, a need remains for a system and method for converting a frame or pixel rate of an incoming digital image frame.

BRIEF DESCRIPTION OF THE DRAWINGS

The foregoing and other objects, features, and advantages of the invention will become more readily apparent from the following detailed description of a preferred embodiment that proceeds with reference to the following drawings.

DETAILED DESCRIPTION OF THE PREFERRED EMBODIMENT

Figure 1:
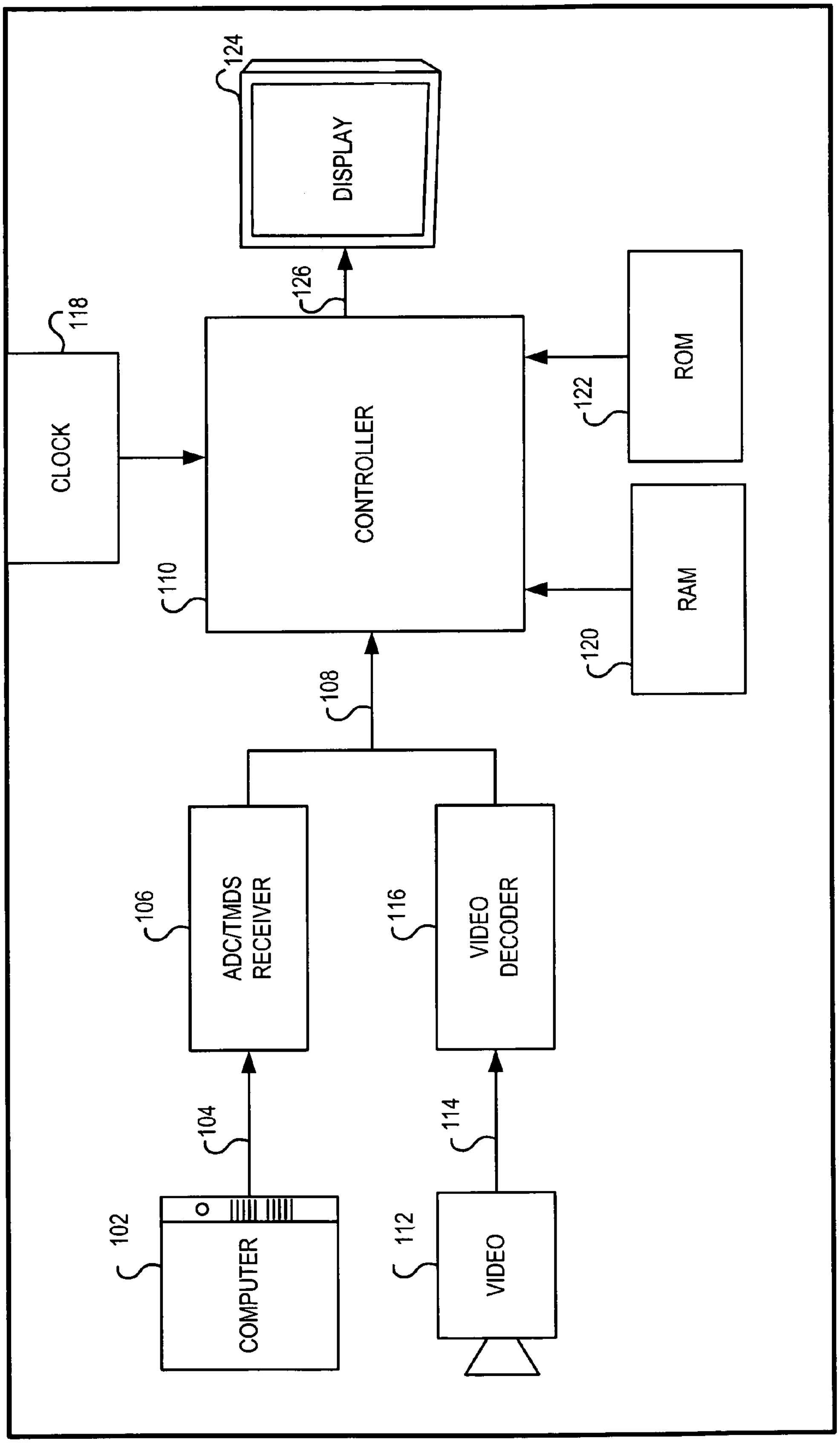
FIG. 1 is a block diagram of a system according to an embodiment of the present invention.

FIG. 1 is a block diagram of a system 100 adapted to display an image. The system includes a receiver 106 for receiving an analog image data signal 104, e.g., an RGB signal, from a source 102. The receiver 106 might be an analog-to-digital converter (ADC), transition minimized differential signal (TMDS) receiver, or the like. The source 102 might be a personal computer or the like. Likewise, a video receiver or decoder 116 decodes an analog video signal 114 from a video source 112. The video source 112 might be a video camcorder and the like. The receiver 106 converts the analog image data signal 104 and/or analog video signal 114 into digital image data 108. The receiver 106 provides the digital image data 108 to the display controller 110.

The display controller 110 generates display data 126 by manipulating the digital image data 108. The display controller 110 provides the display data 126 to a display device 124. The display device 124 is any device capable of displaying digital image data 108. In one embodiment, the display 124 is a pixelated display that has a fixed pixel structure. Examples of pixelated displays are a liquid crystal display (LCD) projector, flat panel monitor, plasma display (PDP), field emissive display (FED), electro-luminescent (EL) display, micromirror technology display, and the like.

In one embodiment, the display controller 110 might scale the digital image data 108 for proper display on the display device 124 using a variety of techniques including pixel replication, spatial and temporal interpolation, digital signal filtering and processing, and the like. In another embodiment, the controller 110 might additionally change the resolution of the digital image data 108, the frame rate, and/or convert the pixel rate encoded in the digital image data 108. Resolution conversion and/or frame rate conversion are not central to the invention and are not discussed in further detail. A person of reasonable skill in the art should recognize that the controller 110 manipulates the digital image data 108 and provides display data 126 to a display device 124 that is capable of properly displaying a high quality image regardless of display type.

Figure 2:
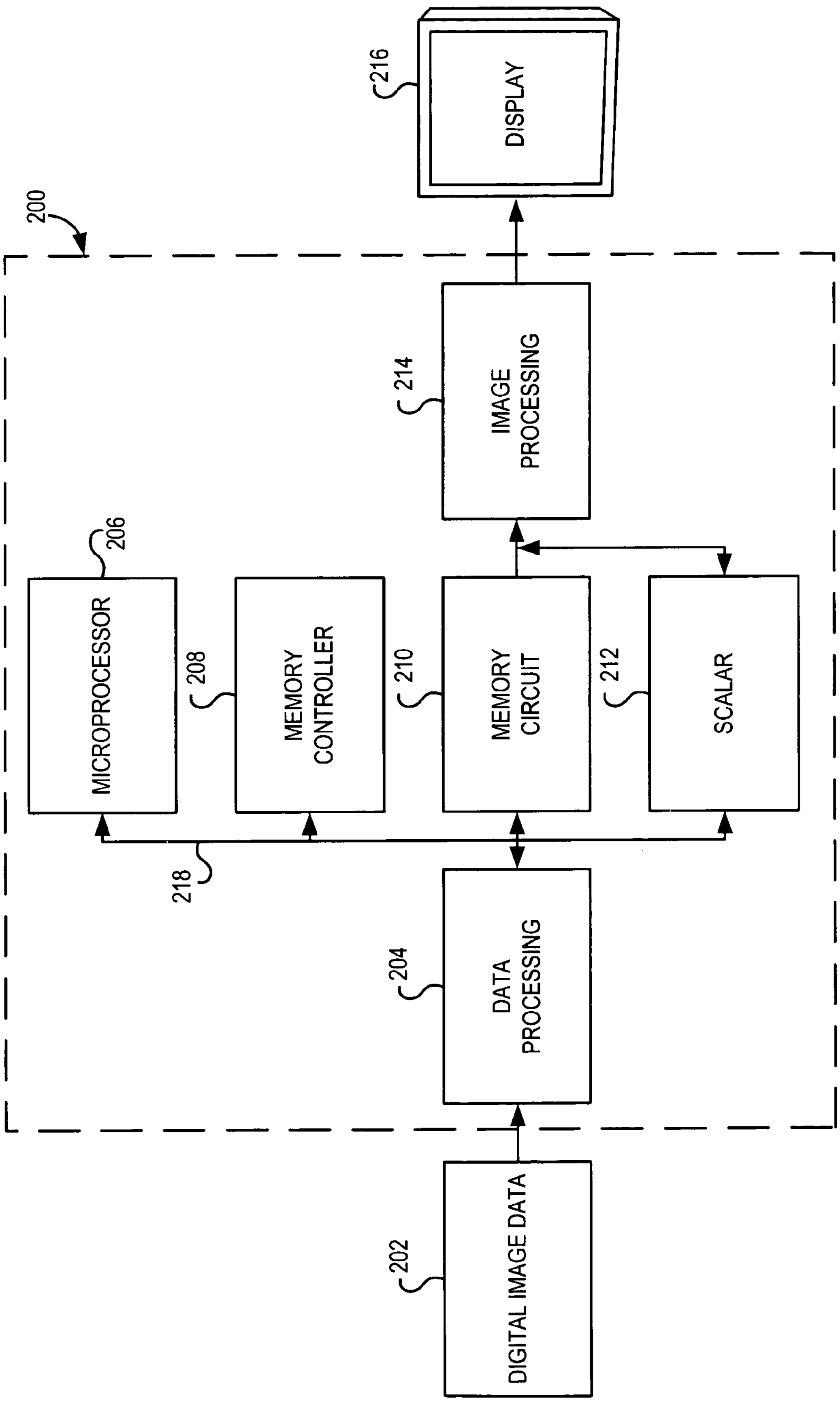
FIG. 2 is a block diagram of an embodiment of the controller shown in FIG. 1.

Read-only (ROM) and random access (RAM) memories 120 and 122, respectively, are coupled to the display system controller 110 and store bitmaps, FIR filter coefficients, and the like. Clock 118 controls timing associated with various operations of the controller 110. FIG. 2 is a block diagram of an embodiment of the controller 110 shown in FIG. 1. Referring to FIG. 2, the controller 200 receives digital image data 202 at a data processing block 204. The data processing block 204 might include an RGB input port (not shown), video port (not shown), and automatic image optimizer (not shown).

The display controller 200 further includes microprocessor 206, a memory circuit 210, memory controller 208, scalar 212, and image processing block 214. The display controller 200 might further include microprocessor peripherals and on-screen display controllers that are not shown in FIG. 2. The display system controller 200 is, in one embodiment, a special-purpose monolithic integrated circuit.

The data processing block 204 receives digital image data 202 for a digital pixelated image—that is, where the image is represented by an array of individually activated picture elements—previously converted from an analog image source such as sources 102 and 112 (FIG. 1). The data processing block 204 might receive data at up to 230 Mpixels/second to thereby support a variety of display modes up to UXGA. Alternatively, the data processing block 204 might receive RGB data having 1 or 2, 24-bit pixels per clock. The data processing block 204 includes a sync processing circuit (not shown) that can operate from separate, composite, or sync-on-green sync signals. The data processing block 204 supports both interlaced and progressive scanned RGB inputs as well as on-chip YUV to RGB conversion. The data processing block 204 supports half-frequency sampling for lower cost display system implementations. Half-frequency sampling reduces system cost by allowing the use of 100 MHz ADCs—FIG. 1 shows a system 100 including an ADC/TMDS receiver 106—while maintaining UXGA image capturing capabilities. Half-frequency sampling involves capturing even pixels on one frame and odd pixels on the following frame.

The data processing block 204 includes a variety of image processing features including automatic image optimization (not shown) for sample clock frequency, phase, black and white levels, image position, and color balance adjustments that do not require user intervention. Advanced synchronization decoding (not shown) allows for a wide variety of synchronization types. The data processing block 204 might include a rotational feature (not shown) that allows rotating a received image by a predetermined number of degrees.

The microprocessor 206 performs all of the control functions necessary for the display system controller 200. The microprocessor 206 is in one embodiment an on-chip general-purpose 16-bit, x86-compatible processor with up to 32 Kbytes of RAM. The microprocessor 206, in one embodiment, runs at clock rates of up to 50 MHz and includes a one-megabyte address space.

The controller 200 includes a full complement of microprocessor peripherals (not shown). In one embodiment, the controller includes I/O ports (e.g., 8-bit I/O ports), an infrared decoder, timers (e.g., 16-bit timers), a watchdog timer, a programmable interrupt controller, an RS-232 serial port, ROM and RAM interface, and decode logic for external peripherals. In one embodiment, the controller 200 includes the above mentioned microprocessor peripherals on-chip, allowing a complete microprocessor system to be implemented by merely adding external ROM and RAM such as RAM 120 and ROM 122 shown in FIG. 1.

The display controller 200 includes a memory circuit 210 controlled by memory controller 208 through bus 218. The memory controller 208 arbitrates access to the buffer 210 from other subsystems within the controller 200 including the data processing block 204, the microprocessor 206, and the scalar 212.

The memory controller 208 additionally dynamically allocates the available memory bandwidth to ensure that the instantaneous pixel bandwidth requirement of each functional unit is met. This includes providing a memory circuit 210 sized to ensure pixel rate conversion as explained in further detail below. In one embodiment, the memory controller 208 dynamically allocates a buffer 210 sized proportionate to a horizontal resolution of the digital image data 202. The memory controller 208 abstracts the physical storage arrangement of data in the buffer 210, which is optimized to maximize memory bandwidth. Each functional unit requests memory access with logical addresses that are translated to physical memory addresses within the memory controller 208.

Figure 3:
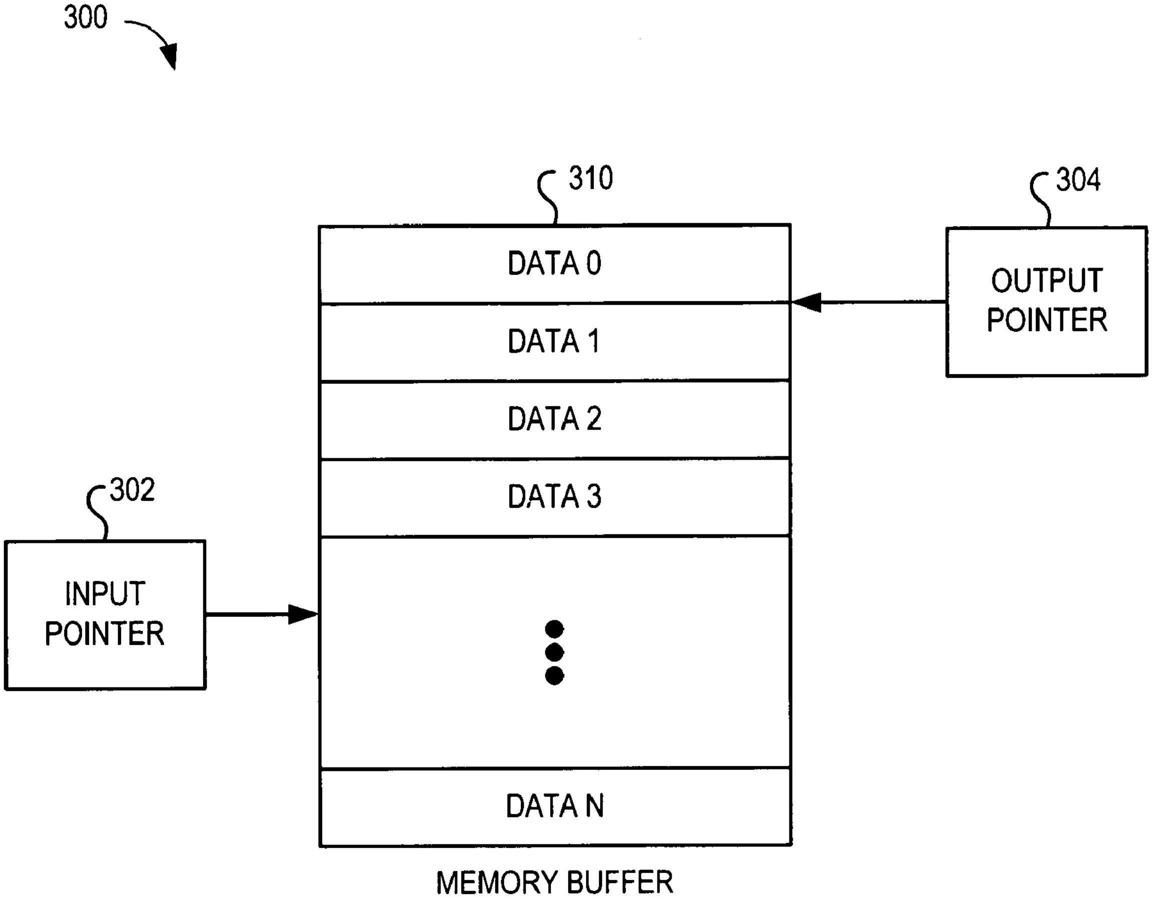
FIG. 3 is a block diagram of an embodiment of the memory buffer shown in FIG. 2.

FIG. 3 is block diagram of the memory circuit 210 shown in FIG. 2. Referring to FIGS. 2 and 3, the memory circuit 300 includes a memory buffer 310, an input pointer 302, and an output pointer 304. The input pointer 302 is adapted to write lines of digital image data 212 into the memory buffer 310 at an input horizontal frequency while the output pointer 304 is adapted to read out lines of the digital image data 212 stored in the memory buffer 310 at an output horizontal frequency. In one embodiment, the input horizontal frequency is different than the output horizontal frequency as described in further detail with reference to FIG. 4. In one embodiment, the input and output pointers 302 and 304, respectively, are fully programmable. That is, a user can program the input and output pointers 302 and 304, respectively, to operate in any number of input and output frequencies, respectively.

Figure 4:
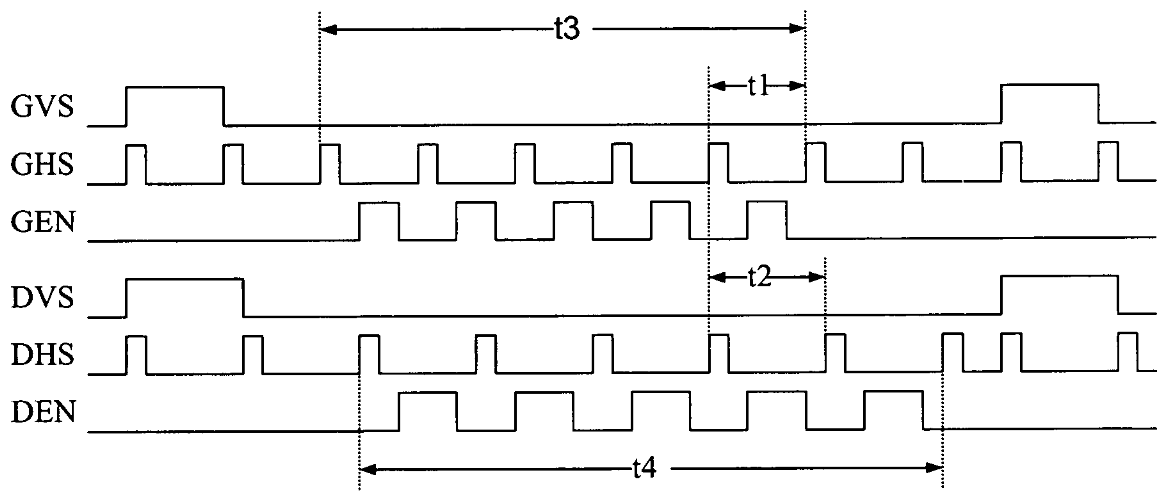
FIG. 4 is a timing diagram of an embodiment of the controller shown in FIG. 1, including its pixel rate conversion method.

FIG. 4 is a timing diagram of an embodiment of the pixel rate conversion of the present invention. Referring to FIGS. 2 and 4, the signals GVS, GHS, and GEN represent the input timing for the vertical, horizontal, and data enable or active periods, respectively. Likewise, the signals DVS, DHS, and DEN represent the output timing for the vertical, horizontal, and data enable (active) periods, respectively. Time t1 indicates the horizontal period of the digital image data 202 received by the display controller 200. Time t2 indicates the horizontal period of the display data 218 supplied by the display controller 200 to the display 216. A person of reasonable skill in the art should understand that the pixel rate (or horizontal input frequency) of the digital image data 202 is substantially the inverse of its horizontal period t1. Similarly, a person of reasonable skill in the art should understand that the pixel rate (or horizontal output frequency) of the display data 218 is substantially the inverse of its horizontal period t2.

Time t3 indicates the total vertical active time for the digital image data 202. Time t4 indicates the total vertical active time for the display data 218. Times t3 and t4 include a vertical blanking time (not shown separately) where the digital image data 202 or the display data 218, respectively, is blanked or left clear of viewable content. Traditionally, the vertical blanking time allowed a television's electron gun to move from the bottom to the top of the screen as it scanned images from top to bottom. A person of reasonable skill should understand that the vertical blanking time in digital display devices is used variously including to encode additional information related to the image, e.g., HTML or closed caption information.

Referring to FIGS. 2-4, the input and output pointers 302 and 304, respectively, in one embodiment, are programmed to operate in any number of different modes. For example, the input pointer 302 might advance faster (at a higher pixel rate) than the output pointer 304 to fill up the buffer 210 with horizontal lines of data from a present frame of the digital image data 202. In this circumstance, the output pointer 304 reads out (n−m) horizontal lines of the a present frame in the time the input pointer 302 completes writing the last horizontal line of the present frame. Once the input pointer 302 completes writing the last line, the input pointer 302 idles using up a portion of the vertical blanking time of the present frame. That is, the input pointer 302 does not begin processing a next image frame until the output pointer 304 completes processing (reading out) the present image frame. The input pointer 302 will not start writing in the first horizontal line of data from the next image frame until the output pointer 304 reads out the last horizontal line of the present image frame. This operative mode is shown in FIG. 4.

In another example, the input pointer 302 might be programmed to advance slower (at a slower pixel rate) than the output pointer 304. In this circumstance, the input pointer 302 is allowed to write a programmable number of horizontal lines of data into the buffer 310 before the output pointer 304 begins reading horizontal lines of data out from the buffer 310 such that the output pointer 304 never points to an empty buffer location.

An advantage to the display controller's pixel rate conversion is that it allows an even slower output frequency than would be possible if you require the horizontal input and output frequencies (not shown separately from horizontal input and output periods t1 and t2) to be equal.

Referring to FIG. 2, the display controller includes a scalar 212 that scales the image represented by the digital image data 202 up or down to any arbitrary resolution. The scalar 212 might include vertical and horizontal scalar circuits (not shown) that independently scale in the vertical and horizontal directions using vertical and horizontal scale factors (not shown). The scalar 212 allows a wide range of image resolutions to be displayed on a fixed pixel resolution display device. For example, in the case of an XGA liquid crystal display desktop monitor, the scalars can be used to perform the following resizing factors:

NTSC up to XGA
VGA up to XGA
SVGA up to XGA
XGA to XGA (no scaling)
SXGA down to XGA
UXGA down to XGA
HDTV down to XGA In one embodiment, the scalar 212 might scale the digital image data 202 using a variety of techniques including pixel replication, spatial and temporal interpolation, digital signal filtering and processing with customizable filters, and the like.

The pixel rate conversion operation described above with reference to FIGS. 2-4 does not account for scaling. The main conceptual difference for scaling is that, in one embodiment, the horizontal period t2 changes by an amount approximately equal to the vertical scale factor (not shown). That is, the pixel rate of the display data 218 changes proportionately to the scale factor. This change allows for more or fewer lines to be produced depending on whether you are scaling up or down. The ability to spread the total output vertical active time t4 over a period which is greater than the total input vertical active time t3 still allows for a slower clock than would normally be required even when scaling.

Referring back to FIG. 2, the display controller 200 includes an image processing block 214. The image processing block 214 processes the pixel rate converted data 220 received from the memory circuit 210 and provides the display data 218 to the display 216. The image processing block 214 might include an OSD controller (not shown separately). In one embodiment, the OSD controller fills and draws OSD bitmaps into the memory circuit 210. An overlay function included in the OSD controller (not shown) allows transparent and semi-transparent overlays to be displayed. In another embodiment, the OSD controller selects on a pixel-by-pixel basis whether to display the scaled, captured image or the OSD bitmap stored in the buffer 210. The OSD controller might be used to implement simple, opaque, character-based menu systems or complex, bitmap-based, menus with transparent backgrounds. Advanced functions such as a translucent highlighter pen and embossed transparent logos are also possible. In one embodiment, the OSD controller supports up to 16 bits per pixel or 64K colors.

The image processing block 214 generates timing signals to control the display 216. The display timing is fully programmable and is completely independent of the image being captured. In one embodiment, the image processing block 214 supports display refresh rates between about 50 Hz to over 100 Hz. In another embodiment, the image processing block 214 includes a color space expander that allows full color display on displays with fewer than 8-bits per color channel. The image processing block 214 might also include programmable color lookup tables that allow for gamma correction, i.e., matching the display's color space to the desired range. The image processing block 214 might also include gain and contrast controls. The image processing block 214 might also support single and dual pixel outputs at up to UXGA (1600×1200) resolution.

The display controller 200 might additionally support a failsafe mode that provides a full desktop image for out of range modes without the need for a full frame buffer. The display controller 200 supports frame rate conversion in the failsafe mode.

An embodiment of the display controller 200 is integrated into a monolithic integrated circuit. Alternatively, any number of discrete logic and other components might implement the invention. A dedicated processor system that includes a microcontroller or a microprocessor might alternatively implement the present invention.

The invention additionally provides methods, which are described below. The invention provides apparatus that performs or assists in performing the methods of the invention. This apparatus might be specially constructed for the required purposes or it might comprise a general-purpose computer selectively activated or reconfigured by a computer program stored in the computer. The methods and algorithms presented herein are not necessarily inherently related to any particular computer or other apparatus. In particular, various general-purpose machines might be used with programs in accordance with the teachings herein or it might prove more convenient to construct more specialized apparatus to perform the required method steps. The required structure for a variety of these machines will appear from this description.

Useful machines or articles for performing the operations of the present invention include general-purpose digital computers or other similar devices. In all cases, there should be borne in mind the distinction between the method of operating a computer and the method of computation itself. The present invention relates also to method steps for operating a computer and for processing electrical or other physical signals to generate other desired physical signals.

The invention additionally provides a program and a method of operation of the program. The program is most advantageously implemented as a program for a computing machine, such as a general-purpose computer, a special purpose computer, a microprocessor, and the like.

The invention also provides a storage medium that has the program of the invention stored thereon. The storage medium is a computer-readable medium, such as a memory, and is read by the computing machine mentioned above.

This detailed description is presented largely in terms of block diagrams, timing diagrams, flowcharts, display images, algorithms, and symbolic representations of operations of data bits within a computer readable medium, such as a memory. Such descriptions and representations are the type of convenient labels used by those skilled in programming and/or the data processing arts to effectively convey the substance of their work to others skilled in the art. A person skilled in the art of programming may use this description to readily generate specific instructions for implementing a program according to the present invention.

Often, for the sake of convenience only, it is preferred to implement and describe a program as various interconnected distinct software modules or features, collectively also known as software. This is not necessary, however, and there may be cases where modules are equivalently aggregated into a single program with unclear boundaries. In any event, the software modules or features of the present invention may be implemented by themselves, or in combination with others. Even though it is said that the program may be stored in a computer-readable medium, it should be clear to a person skilled in the art that it need not be a single memory, or even a single machine. Various portions, modules or features of it may reside in separate memories or separate machines where the memories or machines reside in the same or different geographic location. Where the memories or machines are in different geographic locations, they may be connected directly or through a network such as a local access network (LAN) or a global computer network like the Internet(b.

In the present case, methods of the invention are implemented by machine operations. In other words, embodiments of the program of the invention are made such that they perform methods of the invention that are described in this document. These may be optionally performed in conjunction with one or more human operators performing some, but not all of them. As per the above, the users need not be collocated with each other, but each only with a machine that houses a portion of the program. Alternately, some of these machines may operate automatically, without users and/or independently from each other.

Methods of the invention are now described. A person having ordinary skill in the art should recognize that the boxes described below might be implemented in different combinations, and in different order. Some methods may be used for determining a location of an object, some to determine an identity of an object, and some both.

Figure 5:
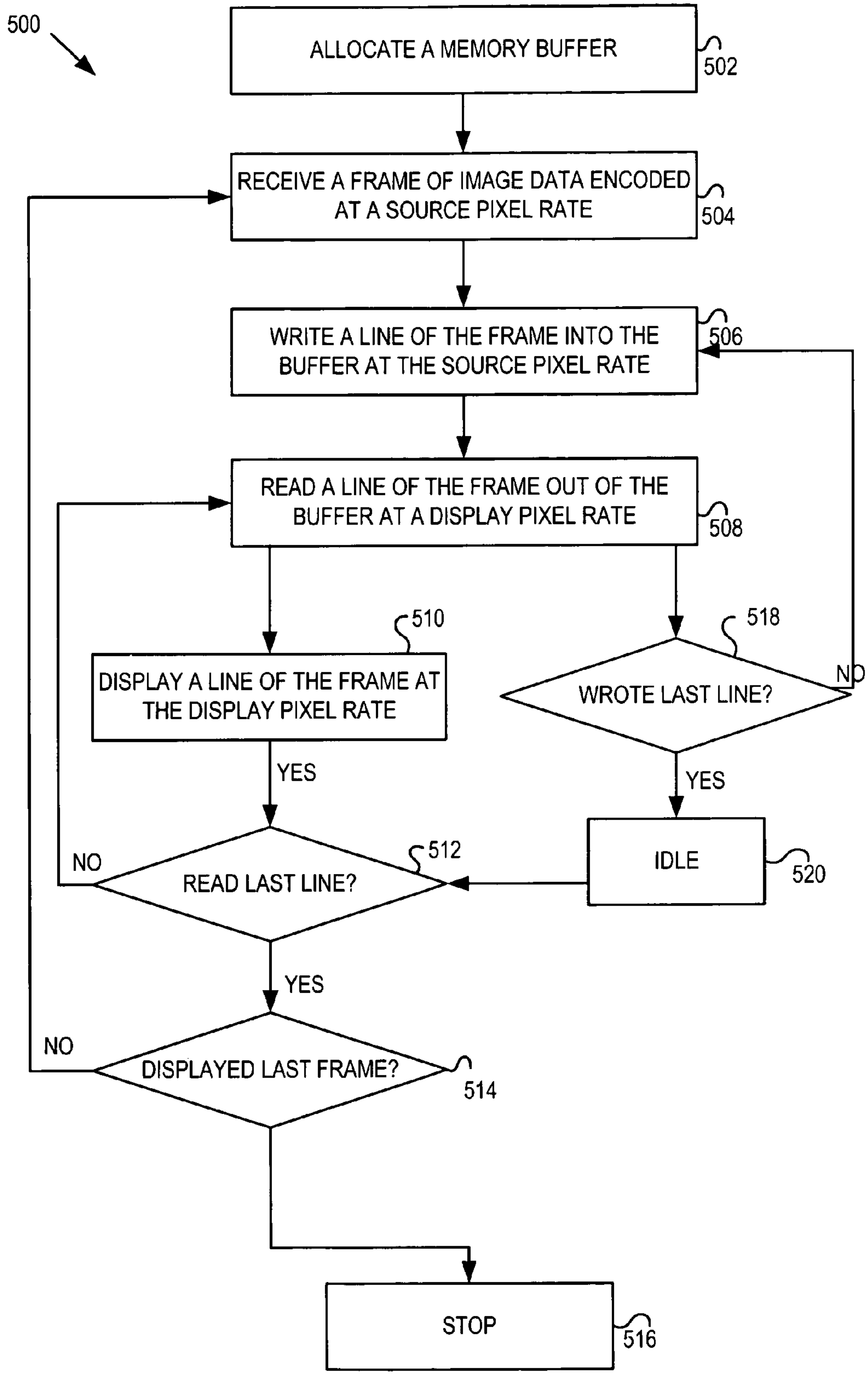
FIG. 5 is a flowchart of an embodiment of a method for converting a pixel rate of an incoming digital image frame.

FIG. 5 is a flowchart of an embodiment of the pixel rate conversion method according to the present invention. Referring to FIG. 5, the controller allocates a memory buffer at box 502. The controller sizes the memory buffer, e.g., proportionate to a horizontal resolution of the image to be displayed. At box 504, the controller receives a frame of digital image data encoded at a source horizontal frequency or pixel rate. At box 506, the controller writes a line of the frame into the memory buffer at the source pixel rate by making an input pointer point to an address in the buffer. If the controller has not written all the lines of the frame in the buffer (box 518), the input pointer advances to the next logical address location in the buffer and writes the next line of the frame into the buffer. The advancing and writing repeats until the controller writes the last line of the buffer into the buffer (box 518).

At box 508, the controller reads out a line of the frame from the buffer at the display pixel rate by making an output pointer point to an address in the buffer. At box 510, the controller sends a line of the frame to be displayed on the display. If the controller has read out the last line of the frame (box 512) and the display has displayed the last frame of the image (box 514), the pixel rate conversion method stops (box 516).

If the controller has not read out the last line of the frame (box 512), the output pointer advances to read out the next line of the frame from the buffer at the display pixel rate (box 508). The display displays the read out line (box 510). Once all lines of the present frame are read out, the controller receives a next frame of the image (box 504).

If the input pointer is programmed to operate at a faster pixel rate than the output pointer, the input pointer idles (box 520) during the frame's vertical blanking time until the output pointer completes reading out the last line of the frame from the buffer. Once the output pointer completes processing the present frame, the controller receives a next image frame and the input pointer writes a first line of the next frame into the buffer. The input pointer advances and writes a second line of the next frame into the buffer and so on.

If, on the other hand, the input pointer is programmed to operate at a slower pixel rate than the output pointer, the input pointer writes a predetermined number of lines of the frame into the buffer before the output pointer reads out lines of the frame from the buffer thereby avoiding the output pointer pointing to an empty location in memory.

Having illustrated and described the principles of our invention, it should be readily apparent to those skilled in the art that the invention can be modified in arrangement and detail without departing from such principles. I claim all modifications coming within the spirit and scope of the accompanying claims.

I claim:

1. A display controller, comprising:

a memory buffer;

an input pointer adapted to write image data into the memory buffer at a horizontal input frequency, in which the horizontal input frequency of the image data is substantially the inverse of a horizontal period of the image data; and an output pointer adapted to read out image data stored in the memory buffer at a horizontal output frequency that is different than the horizontal input frequency;

wherein the memory buffer is dynamically sized responsive to a horizontal resolution of the image data rather than a display resolution and where the horizontal resolution of the image data is a number of pixels in a horizontal line of the image data.

2. The display controller of claim 1 wherein the horizontal input frequency is higher than the horizontal output frequency.

3. The display controller of claim 2 wherein the input pointer is adapted to idle during a vertical blanking time before writing a next line of a next frame of the image data into the memory buffer.

4. The display controller of claim 1 wherein the horizontal input frequency is lower than the horizontal output frequency.

5. The display controller of claim 4 wherein the output pointer is adapted idle until a programmable number of horizontal lines are written by the input pointer into the memory buffer.

6. The display controller of claim 1 comprising a scalar adapted to scale the image data by a scale factor.

7. The display controller of claim 6 wherein the horizontal output frequency changes proportionately to the scale factor.

8. The display controller of claim 1 wherein the controller is a single monolithic integrated circuit.

9. The display controller of claim 1, wherein the display resolution comprises the number of horizontal and vertical pixels in the display.

10. A display system, comprising:
- image data;
- a memory buffer to store the image data at a source pixel rate and write out the image data at a display pixel rate; and
- a display to display the image data at the display pixel rate;
- wherein the display has an image frame resolution; and
- wherein the memory buffer has a size dynamically allocated responsive to a horizontal resolution of the image data rather than the image frame resolution and where the horizontal resolution of the image data is a number of pixels in a horizontal line of the image data.

11. The display system of claim 10 wherein the buffer comprises:
- an input pointer adapted to provide the image data to the buffer at the source pixel rate; and
- an output pointer adapted to provide the image data to the display at the display pixel rate.

12. The system of claim 11 wherein the input pointer is adapted to idle during a vertical blanking time before writing a next line of a next frame of the image data into the memory buffer when the source pixel rate is higher than the display pixel rate.

13. The system of claim 11 wherein the output pointer is adapted to idle until a programmable number of horizontal lines are written by the input pointer into the memory buffer when the source pixel rate is lower than the display pixel rate.

14. The display system of claim 10 wherein the input and output pointers are adapted to be programmed to operate at different frequencies.

15. The system of claim 10 wherein the source pixel rate is higher than the display pixel rate.

16. The system of claim 10 wherein the source pixel rate is lower than the display pixel rate.

17. The system of claim 10 including a scalar adapted to scale the image data by a scale factor.

18. The system of claim 17 wherein the display pixel rate changes responsive to the scale factor.

19. The display system of claim 10, wherein the image frame resolution comprises the number of horizontal and vertical pixels.

20. A method of displaying an image, comprising:
- receiving a frame of image data, the frame including a plurality of lines;
- writing a line into a buffer at a programmable source pixel rate;
- reading the line out of the buffer at a programmable display pixel rate different than the source pixel rate;
- displaying the line on a display at the display pixel rate; and
- dynamically allocating the buffer according to a horizontal resolution of the image rather than a resolution of the display, where the horizontal resolution of the image is a number of pixels in a horizontal line of the image.

21. The method of claim 20 comprising repeating writing, reading, and displaying until all frames in the image are displayed.

22. The method of claim 20 wherein allocating the buffer includes allocating the buffer proportionate to a horizontal resolution of the image.

23. The method of claim 20 wherein writing a line comprises:
- making an input pointer point to the buffer;
- writing the line into the buffer;
- advancing the input pointer; and
- repeating the making, writing, and advancing until all lines in the frame are written into the buffer.

24. The method of claim 23 wherein reading the line comprises:
- making an output pointer point to the buffer;
- reading the line out of the buffer;
- advancing the output pointer; and
- repeating the making, writing, and advancing until all lines in the frame are read out of the buffer.

25. The method of claim 20 including idling during a vertical blanking period before receiving a next frame when the source pixel rate is higher than the display pixel rate.

26. The method of claim 20 including writing a plurality of lines in the buffer before reading out any line when the source pixel rate is slower than the display pixel rate.

27. The method of claim 20 comprising:
- scaling the image by a scale factor; and
- changing the display pixel rate proportionate to the scale factor.

* * * * *

UNITED STATES PATENT AND TRADEMARK OFFICE

CERTIFICATE OF CORRECTION

PATENT NO. : 7,589,736 B1
APPLICATION NO. : 10/150557
DATED : September 15, 2009
INVENTOR(S) : Michael G. West It is certified that error appears in the above-identified patent and that said Letters Patent is hereby corrected as shown below:

Column 7, line 44, the word “lnternet(b.” should read -- Internet®. --.

Signed and Sealed this

Tenth Day of November, 2009

David J. Kappos
*Director of the United States Patent and Trademark Office*